US009206994B2

United States Patent
Matsuo et al.

(10) Patent No.: US 9,206,994 B2
(45) Date of Patent: Dec. 8, 2015

(54) HEAT SOURCE SYSTEM (75) Inventors: Minoru Matsuo, Tokyo (JP); Kenji Ueda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 606 days.

(21) Appl. No.: 13/389,223

(22) PCT Filed: Jun. 30, 2010

(86) PCT No.: PCT/JP2010/061112
§ 371 (c)(1),
(2), (4) Date: Mar. 29, 2012

(87) PCT Pub. No.: WO2011/058781
PCT Pub. Date: May 19, 2011

(65) Prior Publication Data
US 2012/0174609 A1 Jul. 12, 2012

(30) Foreign Application Priority Data
Nov. 13, 2009 (JP) ................................. 2009-259889

(51) Int. Cl.
*F25D 21/06* (2006.01)
*F25B 7/00* (2006.01)
(Continued)

(52) U.S. Cl.
CPC ................. *F24F 11/006* (2013.01); *F25B 1/10* (2013.01); *F24F 2011/0061* (2013.01);
(Continued)

(58) Field of Classification Search
CPC ............. F04D 27/0261; F25B 2500/19; F25B 2600/021; F25B 1/10; Y02B 30/741; F24F 11/006; F24F 2011/0061
USPC .................................... 62/175, 151, 231, 467
See application file for complete search history.

(56) References Cited

U.S. PATENT DOCUMENTS 4,873,649 A * 10/1989 Grald et al. .................... 700/276
5,735,134 A * 4/1998 Liu et al. ........................ 62/230
(Continued)

FOREIGN PATENT DOCUMENTS

CN 101737867 A 6/2010
CN 102265097 A 11/2011
(Continued)

OTHER PUBLICATIONS

International Search Report of PCT/JP2010/061112, mailing date Sep. 21, 2010.
(Continued)

*Primary Examiner* — M. Alexandra Elve
*Assistant Examiner* — Henry Crenshaw
(74) *Attorney, Agent, or Firm* — Westerman, Hattori, Daniels & Adrian, LLP (57) ABSTRACT

Upon newly installing a system or installing an additional heat source apparatuses, manual adjustment of a number-of-units control device should be eliminated. Provided is a heat source system including a plurality of heat source apparatuses connected in parallel; and a number-of-units control device that controls on and off of the plurality of the heat source apparatuses and allocates a load to an active heat source apparatus according to a load demand, wherein the heat source apparatuses each possess COP map unique to the respective heat source apparatuses that indicates a relationship among operating status, coefficient of performance, and load factor, each of the heat source apparatuses sets the appropriate operating region in correspondence to the operating status from the COP map and sends it to the number-of-units control device, and the number-of-units control device performs number-of-units control of the heat source apparatus and load allocation on the basis of the appropriate operating region that is sent from each of the heat source apparatuses.

5 Claims, 11 Drawing Sheets (51) Int. Cl.
  *F25B 19/00* (2006.01)
  *F25B 23/00* (2006.01)
  *F24F 11/00* (2006.01)
  *F25B 1/10* (2006.01)

(52) U.S. Cl.
  CPC ...... *F25B 2339/047* (2013.01); *F25B 2400/13* (2013.01); *F25B 2600/021* (2013.01); *F25B 2700/21161* (2013.01); *F25B 2700/21171* (2013.01); *Y02B 30/741* (2013.01)

(56) References Cited

U.S. PATENT DOCUMENTS

| | | | |
|---|---|---|---|
| 6,532,754 B2* | 3/2003 | Haley et al. | 62/129 |
| 7,257,965 B2* | 8/2007 | Meister | 62/513 |
| 8,812,263 B2* | 8/2014 | Togano et al. | 702/182 |
| 2002/0157405 A1* | 10/2002 | Haley et al. | 62/127 |
| 2003/0019221 A1* | 1/2003 | Rossi et al. | 62/127 |
| 2003/0126875 A1 | 7/2003 | Enomoto | |
| 2003/0167783 A1* | 9/2003 | Goth et al. | 62/157 |
| 2004/0005070 A1 | 1/2004 | Kanda et al. | |
| 2004/0176858 A1 | 9/2004 | Kuwahara et al. | |
| 2005/0144965 A1* | 7/2005 | Ueda et al. | 62/228.1 |
| 2006/0218948 A1* | 10/2006 | Otake et al. | 62/160 |
| 2008/0163642 A1* | 7/2008 | Okamoto et al. | 62/402 |
| 2008/0216495 A1* | 9/2008 | Kates | 62/129 |
| 2008/0223057 A1* | 9/2008 | Lifson et al. | 62/228.4 |
| 2008/0234869 A1 | 9/2008 | Yonezawa et al. | |
| 2009/0125149 A1 | 5/2009 | Miwa | |
| 2010/0170274 A1* | 7/2010 | Ueda | 62/238.6 |
| 2011/0054703 A1 | 3/2011 | Heavner | |
| 2011/0272117 A1 | 11/2011 | Hamstra et al. | |
| 2012/0024517 A1 | 2/2012 | Imanishi et al. | |
| 2012/0174609 A1* | 7/2012 | Matsuo et al. | 62/190 |
| 2012/0222440 A1* | 9/2012 | Matsui et al. | 62/159 |
| 2013/0098084 A1* | 4/2013 | Matsuo et al. | 62/129 |
| 2013/0274948 A1* | 10/2013 | Matsuo et al. | 700/300 |

FOREIGN PATENT DOCUMENTS

| | | | |
|---|---|---|---|
| EP | 2187141 A2 | | 5/2010 |
| JP | 07-035386 A | | 2/1995 |
| JP | 08-075275 A | | 3/1996 |
| JP | 2000-018674 A | | 1/2000 |
| JP | 2001-108281 A | | 4/2001 |
| JP | 2003-85064 A | | 3/2003 |
| JP | 2004-278884 A | | 10/2004 |
| JP | 2004-308950 A | | 11/2004 |
| JP | 2005-114295 | * | 4/2005 |
| JP | 2005-114295 A | | 4/2005 |
| JP | 2006-153324 A | | 6/2006 |
| JP | 2006-207929 A | | 8/2006 |
| JP | 2006-292329 A | | 10/2006 |
| JP | 2007-40584 A | | 2/2007 |
| JP | 2007-071401 A | | 3/2007 |
| JP | 2007-240131 A | | 9/2007 |
| JP | 2008-134013 A | | 6/2008 |
| JP | 2008-157490 A | | 7/2008 |
| JP | 2008-232531 A | | 10/2008 |
| JP | 2009-204262 A | | 9/2009 |
| JP | 2010-270970 A | | 12/2010 |
| JP | 2011-21855 A | | 2/2011 |
| JP | 2011-58660 A | | 3/2011 |
| WO | 2010/073579 A1 | | 7/2010 |

OTHER PUBLICATIONS

Korean Decision to Grant a Patent dated Jan. 22, 2014, issued in corresponding Korean application No. 10-2012-7001593 (2 pages). Explanation of Relevance: the Decision to Grant a Patent has been received.
Office Action dated Feb. 21, 2014, issued in Korean Patent Application No. 10-2014-7000156 with English Translation (6 pages).
Decision to Grant a Patent dated Oct. 1, 2013, issued in corresponding Japanese Patent Application No. 2009-259889. Concise Explanation of Relevance: "The Decision to Grant a Patent has been received" (3 pages).
Chinese Decision to Grant a Patent dated May 5, 2014, issued in corresponding Chinese Patent Application No. 201080035129.6, w/English language concise explanation of relevance (3 pages).
Korean Notice of Allowance issued Sep. 22, 2014, for Korean Application No. 2014-7000156;(2 pages). (Explanation of relevance: The Korean Notice of Allowance has been received.).
Korean Decision to Grant a Patent dated Jan. 16, 2015, issued in Korean Patent Application No. 10-2013-7009785 with English translation (4 pages).
International Search Report of PCT/JP2012/054729,mailing date of May 15, 2012.
Written Opinion dated May 15, 2012, issued in corresponding application No. PCT/JP2012/054729.(2 pages).
Decision to Grant a Patent dated May 7, 2014, issued in Japanese Patent Application No. 2011-074474, The Decision to Grant a Patent has been received (3 pages).
Extended European Search Report dated Sep. 24, 2014, issued in corresponding European Application No. 12763639.7.(7 pages).
Office Action dated Jun. 2, 2015, issued in counterpart Chinese Patent Application No. 201280003986.7 w/English translation (14 pages).
U.S. Non-Final Office Action dated Aug. 26, 2015, issued in related U.S. Appl. No. 13/995,032 (9 pages).

* cited by examiner

HEAT SOURCE SYSTEM

TECHNICAL FIELD

The present invention relates to a heat source system provided with a plurality of heat source apparatuses, such as centrifugal chillers etc.

BACKGROUND ART

Heat source systems that are provided with a plurality of heat source apparatuses, such as centrifugal chillers etc., are conventionally known for achieving district cooling/heating, cooling/heating in factories etc., and so forth. These heat source systems control the number of operating heat source apparatuses in accordance with the heat demand required by external loads. Upon performing this number-of-units control, It is required to achieve an energy saving by operating the heat source apparatuses at high efficiency.

PTL 1 discloses a technology in which an inverter is controlled in such a manner that the coefficient of performance is equal to or more than a predetermined value by obtaining the relationship between the load factor and the coefficient of performance of an inverter-driven centrifugal chiller, which is determined by the cooling water temperature supplied to a condenser.

CITAION LIST

Patent Literature

{PTL 1} Japanese Unexamined Patent Application, Publication No. 2005-114295

SUMMARY OF INVENTION

Technical Problem

In the known art described in PTL 1, a number-of-units control device that performs number-of-units control of heat source apparatuses needs to possess, in advance, the relationship between the coefficient of performance of the respective heat source apparatuses under its control and the load factor. Therefore, for example, when an additional heat source apparatus is to be installed, there will be a manual operation of newly inputting to the number-of-units control device the relationship between the coefficient of performance of the additionally installed heat source apparatus and the load factor. In particular, installation work for the additional heat source apparatus needs to be conducted rapidly by reducing the number of steps as much as possible because the work is conducted on a system that has been pre-installed for a customer.

The present invention has been conceived in light of the above-described circumstances, and an object thereof is to provide a heat source system that is capable of eliminating manual adjustment of a number-of-units control device upon newly installing a system or installing an additional heat source apparatus.

Solution to Problem

In order to solve the problems described above, the present invention employs the following solutions.

A first aspect according to the present invention is a heat source system comprising: a plurality of heat source apparatuses connected in parallel; and a number-of-units control device that controls on and off of the plurality of heat source apparatuses and allocates a load to an operating heat source apparatus according to a load demand, wherein the heat source apparatuses each possess COP information unique to the respective heat source apparatuses that indicates a relationship among operating status, coefficient of performance, and load factor, set, at a predetermined timing, an appropriate operating region that is a load region where the coefficient of performance is equal to or more than a predetermined value from the possessed COP information, and send the appropriate operating region to the number-of-units control device at a predetermined timing, and the number-of-units control device performs number-of-units control and load allocation such that each of the heat source apparatuses is operated within the appropriate operating region of that heat source apparatus.

According to the first aspect of the present invention described above, the heat source apparatuses each possess COP information indicating a relationship between its coefficient of performance and load factor, set, at a predetermined timing, the appropriate operating region that is a load region where the coefficient of performance is equal to or more than a predetermined value from this COP information, and send this appropriate operating region to the number-of-units control device at a predetermined timing. By doing so, even if the number-of-units control device itself does not possess the COP information of the respective heat source apparatuses in advance, it is possible to ascertain the appropriate operating regions of the respective heat source apparatuses on the basis of the COP information that is sent from the respective heat source apparatuses and to distribute the load within the appropriate operating region to the respective heat source apparatuses. As a result, upon newly installing a system or installing an additional heat source apparatus in buildings etc., manual adjustment, such as storing of the COP information into the number-of-units control device, can be eliminated.

In the heat source system according to the first aspect of the present invention described above, when an operable region has been set on the basis of a restriction of a device constituting each of the heat source apparatuses, each of the heat source apparatuses may set a first load region that satisfies both the operable region and the appropriate operating region, and send the first load region to the number-of-units control device, and the number-of-units control device may perform number-of-units control and load allocation such that each of the heat source apparatuses is operated within the first load region of that heat source apparatus.

According to the above-described configuration, operation taking account of not only the appropriate operating region but also the operable region that is restricted for the sake of performance and safety of the respective devices constituting the heat source apparatus allows a suitable load region to be set. As a result, the number-of-units control device can operate the respective heat source apparatuses in a more suitable load region, thereby making it possible to prevent deterioration etc. of the devices in the respective heat source apparatuses, thus extending their lifetime.

In the heat source system according to the first aspect of the present invention described above, when the first load region is narrower than a predetermined region set in advance, each of the heat source apparatuses may send the operable region, instead of the first load region, to the number-of-units control device, and the number-of-units control device may perform number-of-units control and load allocation such that the heat source apparatus to which the operable region has been sent instead of the first load region is operated within that operable region.

According to the above-described configuration, it is possible to avoid a situation where the load region that satisfies both the appropriate operating region and the operable region is so narrow that the load demand cannot be satisfied fully even if all the heat source apparatuses are in operation.

In the heat source system according to the first aspect of the present invention described above, the heat source apparatus may possess a second load region for further increasing operating efficiency in that heat source apparatus and a condition for employing the second load region in such a manner as to be associated with each other and send the second load region to the number-of-units control device when the condition for employing the second load region is satisfied, and the number-of-units control device may perform number-of-units control and load allocation such that the heat source apparatus to which the second load region has been reported is operated within the second load region.

According to the above-described configuration, if a situation occurs in which the operating efficiency is decreased even when the heat source apparatuses are operated within the appropriate operating region, it is possible to perform number-of-units control of the heat source apparatuses and load sharing to the heat source apparatuses by employing another operation load region for avoiding such a situation. As a result, it is possible to improve the operating efficiency even more.

The heat source apparatus employed in the above-described heat source system includes a centrifugal chiller, as an example, that is provided with, for example, a turbo compressor of either an inverter-driven variable-rotation-speed type or a fixed-rotation-speed type; a condenser that condenses the refrigerant compressed by the turbo compressor; an expansion valve that expands the condensed refrigerant; and an evaporator that evaporates the expanded refrigerant to cool chilled water.

A second aspect of the present invention is a heat source system comprising: a plurality of heat source apparatuses connected in parallel; and a number-of-units control device that controls on and off of the plurality of heat source apparatuses and allocates a load to an active heat source apparatus according to a load demand, wherein the heat source apparatuses each possess COP information unique to the respective heat source apparatuses that indicates a relationship among operating status, coefficient of performance, and load factor and sends the information related to the possessed COP information to the number-of-units control device at a predetermined timing; and the number-of-units control device sets, for every heat source apparatus, an appropriate operating region that is a load region where the coefficient of performance of each of the heat source apparatuses is equal to or more than a predetermined value on the basis of the information related to the COP information that is sent from the respective heat source apparatus, and performs number-of-units control and load allocation such that each of the heat source apparatuses is operated within the appropriate operating region of that heat source apparatus.

According to the second aspect of the present invention described above, each of the heat source apparatuses possess COP information that indicates a relationship between its coefficient of performance and the load factor, and the information related to this COP information (for example, the COP information itself or the information indicating a relationship between the coefficient of performance and the load factor relating to the present operating status, among the COP information) is sent from the respective heat source apparatuses to the number-of-units control device at a predetermined timing. On the basis of the information related to the COP information sent from the respective heat source apparatuses, the number-of-units control device sets the appropriate operating region that is the load region where the coefficient of performance is equal to or more than a predetermined value for the respective heat source apparatuses and performs number-of-units control and load allocation such that the respective heat source apparatuses are operated within the appropriate operating region of the heat source apparatuses.

By doing so, even if the number-of-units control device itself does not have the COP information of the respective heat source apparatuses in advance, it is possible to ascertain the appropriate operating region of the respective heat source apparatuses on the basis of the COP information that is sent from the respective heat source apparatuses and to distribute the load within the appropriate operating region to the respective heat source apparatuses. As a result, upon newly installing a system or installing an additional heat source apparatus in buildings etc., manual adjustment, such as a storing of the COP information into the number-of-units control device, can be eliminated.

Advantageous Effects of Invention

According to the present invention, upon newly installing a system or installing an additional heat source apparatus, an effect in which manual adjustment of a number-of-units control device is not needed can be afforded.

DESCRIPTION OF EMBODIMENTS

[First Embodiment]

A heat source system according to a first embodiment of the present invention will be described below with reference to the drawings.

Figure 1:
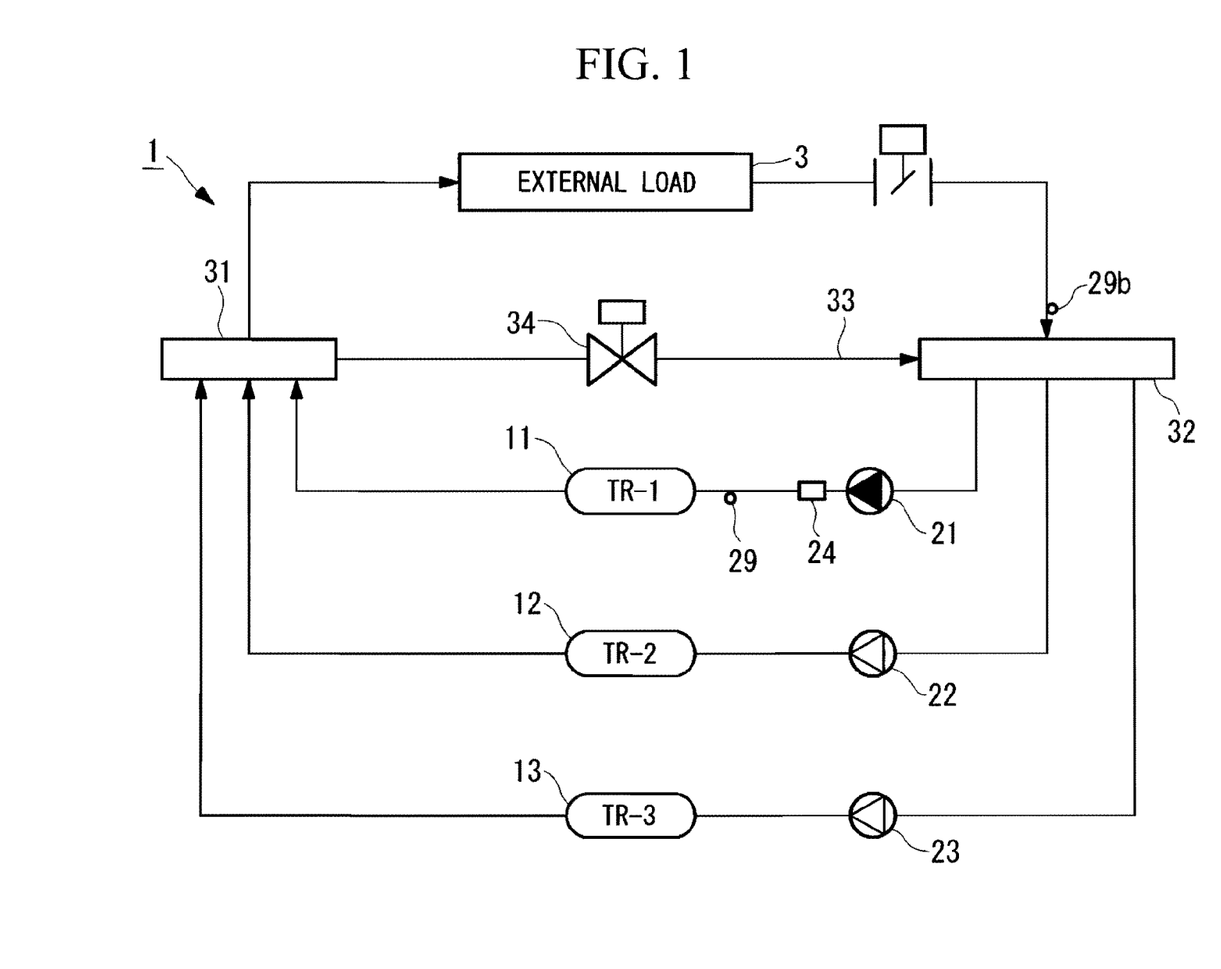
FIG. 1 is a diagram showing the overall configuration of a heat source system according to a first embodiment of the present invention.

The configuration of a heat source system 1 according to this embodiment is shown in FIG. 1 in outline. The heat source system 1 is installed in, for example, buildings and plant facilities. As shown in FIG. 1, the heat source system 1 is provided with three heat source apparatuses 11, 12, and 13 that perform cooling of chilled water (heat medium) that is supplied to an external load 3, such as an air conditioner, a fan coil, and so forth. These heat source apparatuses 11, 12, and 13 are arranged in parallel with the external load 3.

Chilled water pumps 21, 22, and 23 that pump chilled water are arranged at the upstream side, in the flow direction of the chilled water, of the respective heat source apparatuses 11, 12, and 13. These chilled water pumps 21, 22, and 23 send chilled water from a return header 32 to the respective heat source apparatuses 11, 12, and 13. Each of the chilled water pumps 21, 22, and 23 is driven by an inverter motor, thereby making the rotation speed variable and enabling variable control of the flow rate.

Chilled water obtained in the respective heat source apparatuses 11, 12, and 13 is collected at a supply header 31. The chilled water collected in the supply header 31 is supplied to the external load 3. The chilled water involved in air conditioning etc. at the external load 3 and heated is then sent to the return header 32. The chilled water is divided into the respective heat source apparatuses 11, 12, and 13 at the return header 32.

A chilled water flowmeter 24 that measures the flow rate of the chilled water flowing out from the chilled water pump 21 is provided at the downstream side of the chilled water pump 21. The output from this chilled water flowmeter 24 is sent to a heat-source-apparatus control device 74-1 (see FIG. 4) of the heat source apparatus 11 described below.

A chilled water-inlet temperature sensor 29 that measures the temperature of the chilled water flowing into the heat source apparatus 11 is provided on a chilled water pipe at the upstream side of the heat source apparatus 11. The output from this chilled water-inlet temperature sensor 29 is sent to the heat-source-apparatus control device 74-1 (see FIG. 4) described below. Note that, if a bypass valve 34 of a bypass pipe 33 is fully closed, a temperature sensor 29b provided on a chilled water pipe at the upstream side of the return header 32 may be used instead of the chilled water-inlet temperature sensor.

Chilled water flowmeters and the chilled water-inlet temperature sensors are also provided for the heat source apparatus 12 and the heat source apparatus 13, as in the heat source apparatus 11. However, in FIG. 1, for the sake of ease of understanding, the configuration thereof is shown only for the centrifugal chiller 11.

Figure 2:
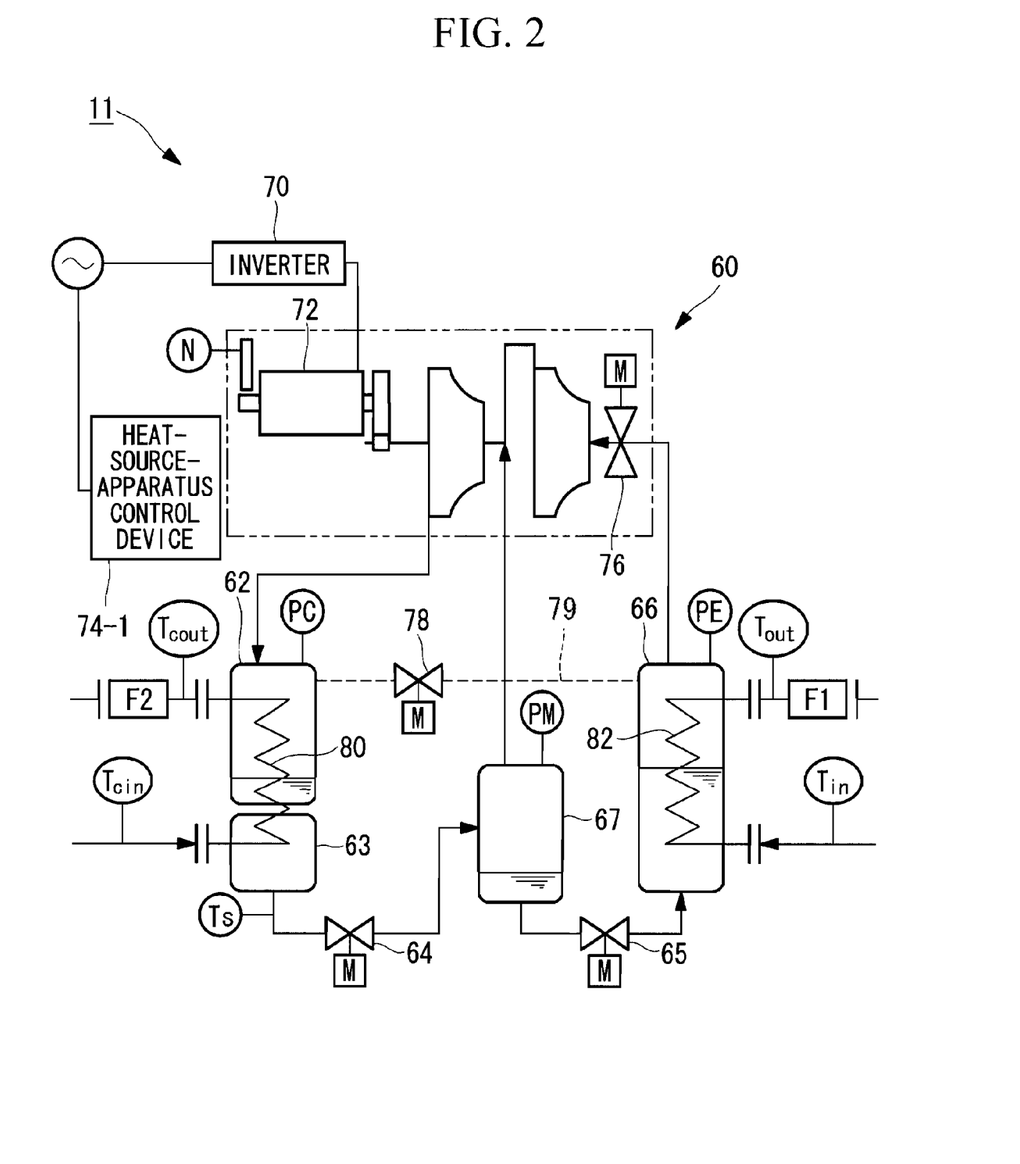
FIG. 2 is a diagram showing an example of a heat source apparatus that is employed in the heat source system in FIG. 1.

FIG. 2 shows the detailed configuration of a case where centrifugal chillers are employed in the heat source apparatuses 11, 12, and 13. In this figure, for the sake of ease of understanding, among the three heat source apparatuses provided in parallel, only one first heat source apparatus 11 is shown.

The heat source apparatus 11 has a configuration that can achieve a two-stage compression, two-stage expansion subcooling cycle. This centrifugal chiller 11 is provided with a turbo compressor 60 that compresses refrigerant, a condenser 62 that condenses the high-temperature, high-pressure gaseous refrigerant that has been compressed by the turbo compressor 60, a subcooler 63 that subcools liquid refrigerant that has been condensed in the condenser 62, a high-pressure expansion valve 64 that expands the liquid refrigerant from the subcooler 63, an intercooler 67 that is connected to the high-pressure expansion valve 64, to an intermediate stage of the turbo compressor 60, and to a low-pressure expansion valve 65, and an evaporator 66 that evaporates the liquid refrigerant that has been expanded by the low-pressure expansion valve 65.

The turbo compressor 60 is a centrifugal two-stage compressor that is driven by an electric motor 72 whose rotation speed is controlled by an inverter 70. The output of the inverter 70 is controlled by the heat-source-apparatus control device 74-1. Note that, the turbo compressor 60 may be a compressor having a fixed rotation speed. An inlet guide vane (hereinafter, referred to as "IGV") 76 that controls the flow rate of the refrigerant taken-in is provided at a refrigerant inlet of the turbo compressor 60, thereby enabling capacity control of the centrifugal chiller 11.

The condenser 62 is provided with a condensed refrigerant pressure sensor Pc that measures the condensing refrigerant pressure. The output of the sensor Pc is sent to the heat-source-apparatus control device 74-1.

The subcooler 63 is provided at the downstream side of the condenser 62 in the refrigerant flow direction so as to provide subcooling of the condensed refrigerant. A temperature sensor Ts that measures the refrigerant temperature after subcooling is provided at the just downstream side of the subcooler 63 in the refrigerant flow direction.

A cooling heat exchanger tube 80 that cools the condenser 62 and the subcooler 63 is inserted through the condenser 62 and the subcooler 63. The flow rate of the cooling water, the cooling water outlet temperature, and the cooling water inlet temperature are measured by a flowmeter F2, a temperature sensor Tcout, and a temperature sensor Tcin, respectively. After waste heat is extracted to the atmosphere at a cooling tower (not shown), the cooling water is guided again to the condenser 62 and the subcooler 63.

The intercooler 67 is provided with a pressure sensor PM that measures intermediate pressure.

The evaporator 66 is provided with a pressure sensor PE that measures evaporating pressure. Heat absorption in the evaporator 66 provides chilled water having a rated temperature (for example, 7° C.). A chilled water heat exchanger tube 82 that cools chilled water, which is supplied to the external load, is inserted through the evaporator. The flow rate of chilled water, the chilled water outlet temperature, and the chilled water inlet temperature are measured by a flowmeter F1, temperature sensor Tout, and temperature sensor Tin, respectively.

A hot gas bypass pipe 79 is provided between a gas-phase portion in the condenser 62 and a gas-phase portion in the evaporator 66. A hot gas bypass valve 78 that controls the flow rate of the refrigerant flowing in the hot gas bypass pipe 79 is also provided. By adjusting the hot gas bypass flow rate with the hot gas bypass valve 78, capacity control in a very small region that is not sufficiently controlled by the IGV 76 is enabled.

Figure 3:
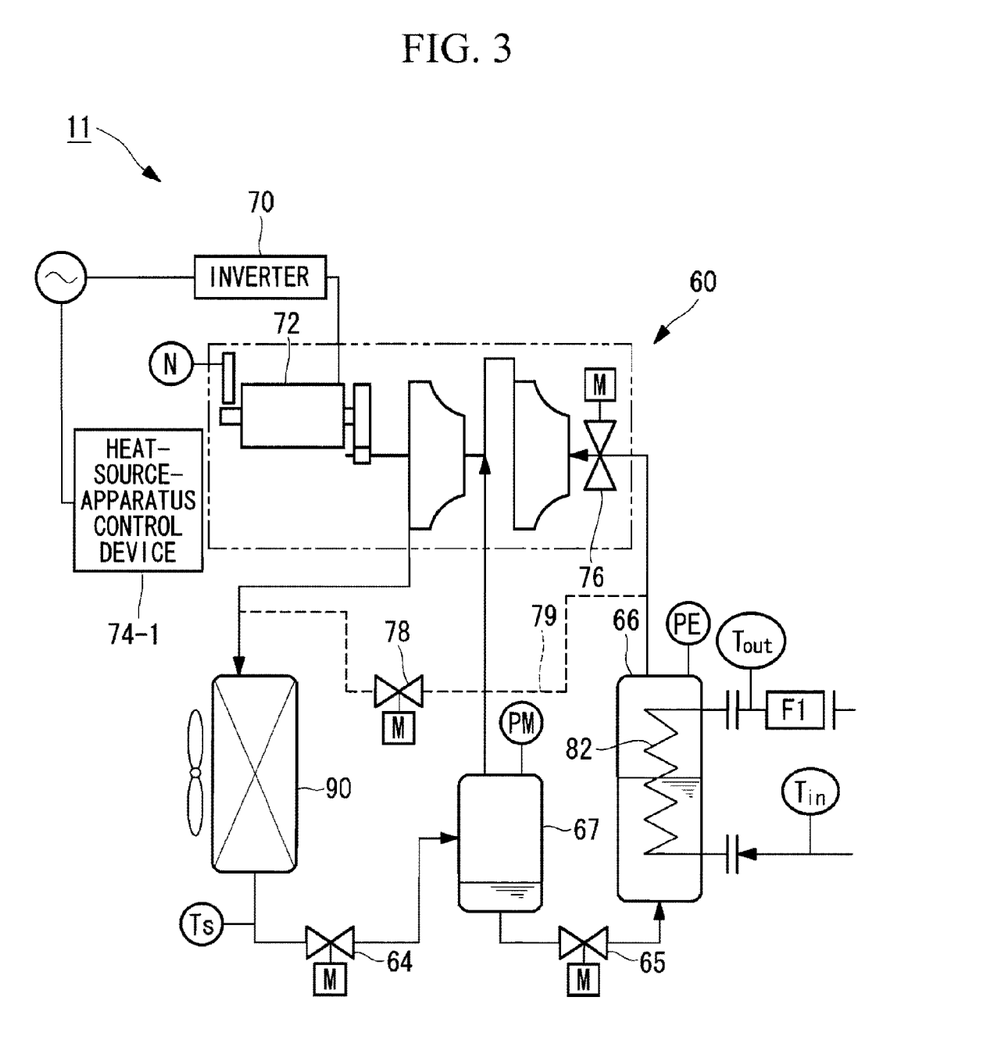
FIG. 3 is a diagram showing an example of a heat source apparatus that is employed in the heat source system in FIG. 1.

In addition, in the centrifugal chiller 11 shown in FIG. 2, the case in which the condenser 62 and the subcooler 63 are provided, heat exchange is conducted between the refrigerant and the cooling water that has extracted waste heat to the atmosphere at the cooling tower, and the cooling water is warmed has been described; however, as shown in FIG. 3, for example, a configuration in which an air heat exchanger 90 is arranged instead of the condenser 62 and the subcooler 63 so as to conduct heat exchange between the outside air and the refrigerant in the air heat exchanger 90 may be employed.

In addition, the heat source apparatuses 11, 12, and 13 employed in this embodiment are not limited to the above-described centrifugal chillers having a cooling function only, and for example, those having only a heating function or those having both a cooling function and a heating function may be employed. In addition, the medium that is subjected to heat exchange with the refrigerant may be either water or air. In addition, the first to third heat source apparatuses 11, 12, and 13 may be chillers of the same type, or several types of chillers may be present.

Figure 4:
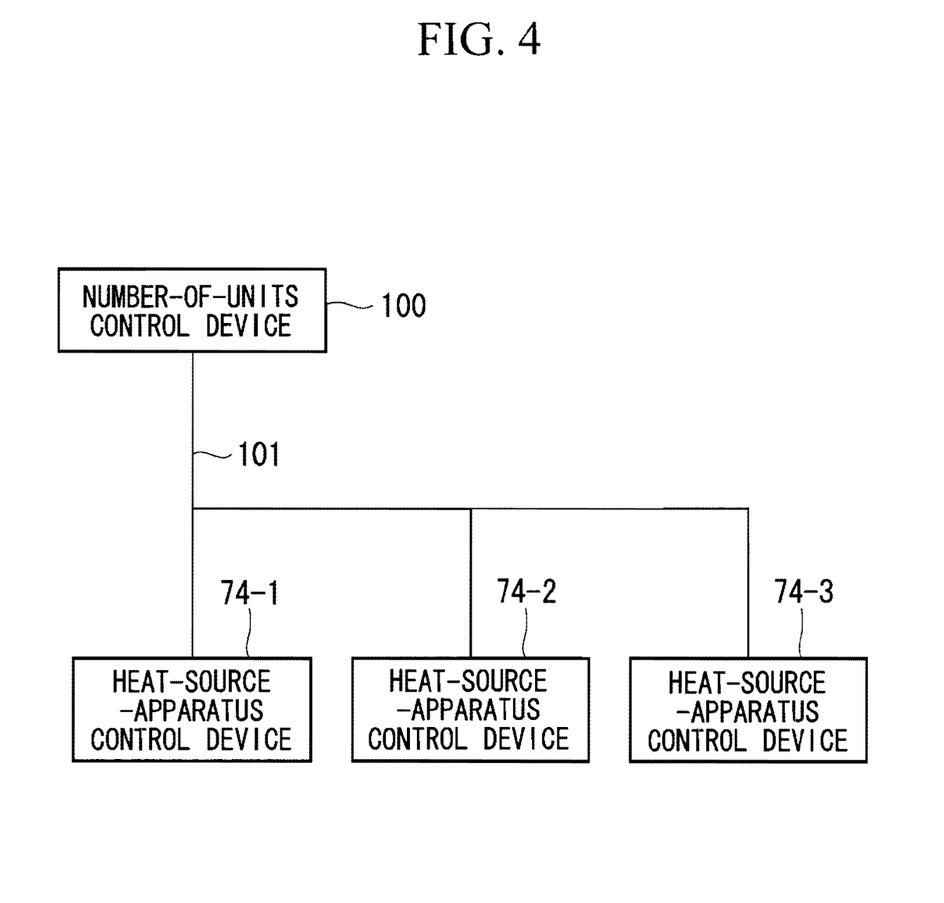
FIG. 4 is a diagram showing, in outline, the configuration of a control system related to number-of-units control of the heat source system shown in FIG. 1.

FIG. 4 is a diagram showing, in outline, the configuration of a control system related to the number-of-units control of the heat source system 1 shown in FIG. 1. As shown in FIG. 4, heat-source-apparatus control devices 74-1, 74-2, and 74-3 that respectively control the heat source apparatuses 11, 12, and 13 are connected to a number-of-units control device 100 through a communication medium 101 to realize a configuration enabling mutual communication.

Figure 5:
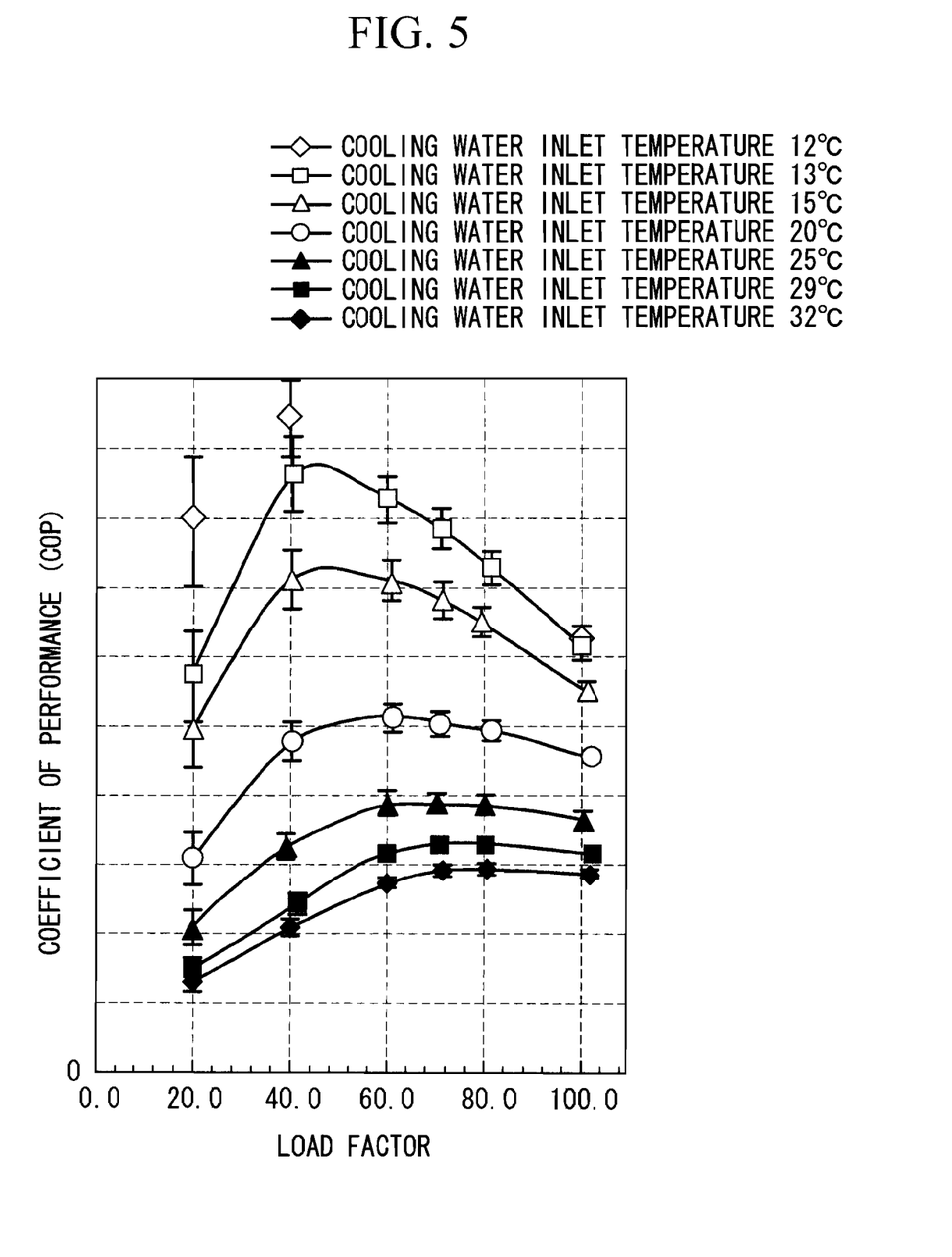
FIG. 5 is a diagram showing an example of a COP map.

Each of the heat-source-apparatus control devices 74-1, 74-2, and 74-3 has a COP map that indicates a relationship between a load factor and a coefficient of performance (hereinafter, referred to as "COP") for every predetermined cooling water inlet temperature for the respective heat source apparatuses 11, 12, and 13. An example of the COP map is shown in FIG. 5. As shown in FIG. 5, in the COP map, the load factor is shown on the horizontal axis and the COP is shown on the vertical axis, and a characteristic (hereinafter, referred to as "COP characteristic") indicating the relationship between the load factor and the COP for every cooling water inlet temperature is shown. This COP map can be obtained by, for example, testing the respective heat source apparatuses 11, 12, and 13 before delivery. Note that the COP map is made by employing a known technique.

Because the COP map differs between the cooling operation and the heating operation, for a heat source apparatus capable of cooling and heating operations, respective COP maps are prepared for the cooling operation mode and the heating operation mode.

In addition, the COP map indicates either an overall COP characteristic of all heat source apparatuses, including the characteristics of auxiliary equipment (for example, a chilled/hot water pump, a cooling water pump, a cooling tower, and so forth) of the respective heat source apparatuses, or the COP characteristic of one heat source apparatus, excluding the characteristics of the auxiliary equipment.

As described above, the cooling water inlet temperature measured with a cooling-water-inlet temperature sensor provided on the cooling water pipe of the heat source apparatus 11 is input to the heat-source-apparatus control device 74-1. In addition, the cooling water inlet temperatures are similarly input to the heat-source-apparatus control device 74-2 and the heat-source-apparatus control device 74-3 from the cooling-water-inlet temperature sensors provided on the respective cooling water pipes of the heat-source-apparatus control device 74-2 and the heat-source-apparatus control device 74-3. Using the COP map that corresponds to the present operation mode (cooling operation mode or heating operation mode), each of the heat-source-apparatus control devices 74-1, 74-2, and 74-3 obtains COP characteristic that corresponds to the cooling water inlet temperature from the cooling-water-inlet temperature sensor, obtains the appropriate operating region in this characteristic, and sends this appropriate operating region to the number-of-units control device 100.

The appropriate operating region specifies, for example, a load factor region indicating a COP of at least a predetermined percentage (for example, at least 80%) relative to the peak value in the COP characteristic that corresponds to the present cooling water inlet temperature, and this load factor region is set as the appropriate operating region.

Note that, for example, when the present operation mode of the heat source system 1 is the heating operation mode, and if there is a heat source apparatus that does not have a function for a heating operation mode, the heat-source-apparatus control device of the heat source apparatus outputs 0 (zero) % as the appropriate operating region because the heat-source-apparatus control device does not originally have the COP map that corresponds to the present operation mode. As described above, the heat source apparatus that does not have a function for adapting to the present operation mode of the heat source system 1 outputs 0% as the appropriate operating region at that time.

Based on the appropriate operating regions sent from the respective heat-source-apparatus control devices 74-1, 74-2, and 74-3 and the load demands gotten from the external load, the number-of-units control device 100 instructs each of the heat-source-apparatus control devices 74-1, 74-2, and 74-3 about on and off of the heat source apparatuses 11, 12, and 13, and in addition, for example, the number-of-units control device 100 also controls auxiliary equipment, such as the chilled water pump 21 etc.

Among the contents of various types of control performed by the number-of-units control device 100, a series of procedures related to number-of-units control of the heat source apparatuses 11, 12, and 13 according to the present invention will be described below with reference to FIG. 6.

Figure 6:
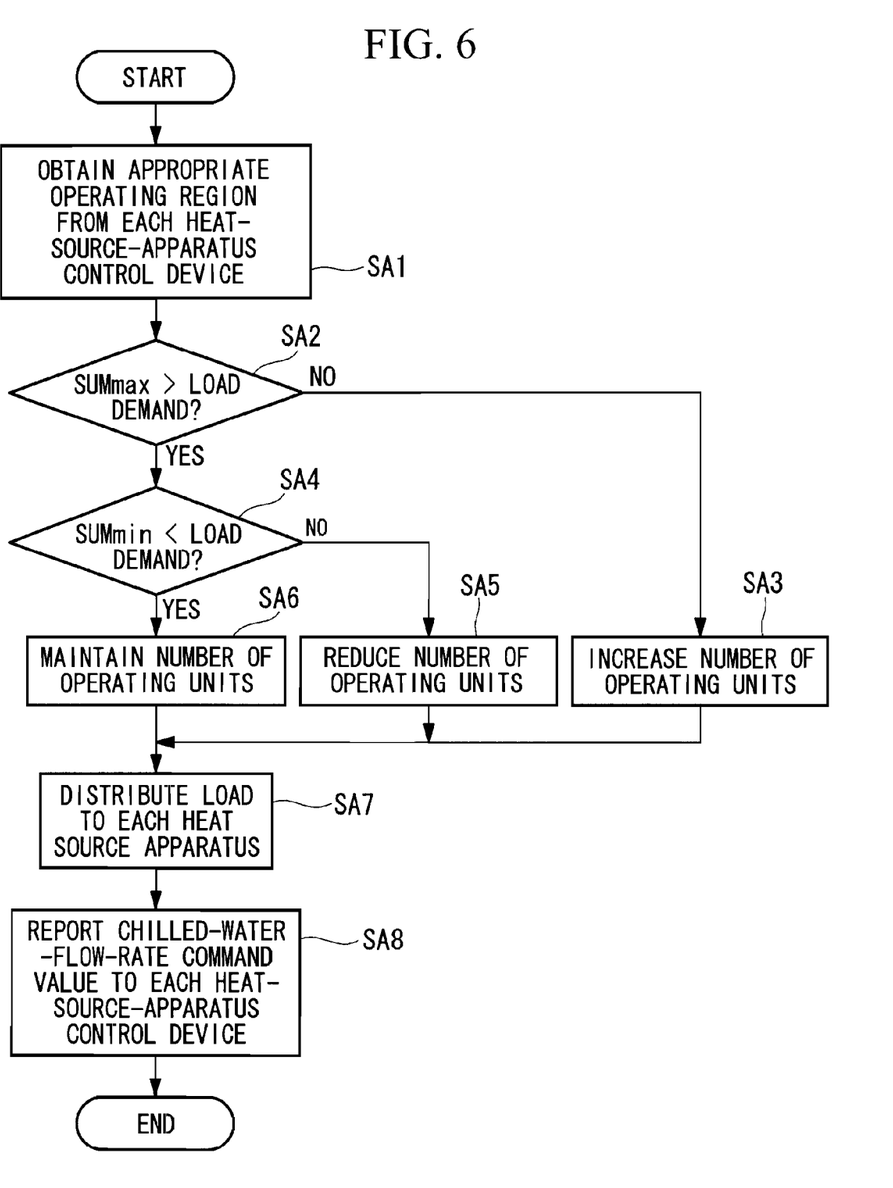
FIG. 6 is a diagram showing a control flow of number-of-units control of heat source apparatuses performed by the number-of-units control device of the heat source system according to the first embodiment of the present invention.

The number-of-units control device 100 obtains the appropriate operating regions from each of the heat-source-apparatus control devices 74-1, 74-2, and 74-3 (step SA1 in FIG. 6), extracts the maximum load in the appropriate operating region (the maximum load factor in the appropriate operating region) of the presently operating heat source apparatus, calculates a sum SUMmax of these values, and determines whether this sum SUMmax exceeds the load demand of the heat source system 1 (step SA2 in FIG. 6). If, as a result, the sum SUMmax is equal to or less than the load demand, in order to cover the present load demand, the number of heat source apparatus currently operating is increased (step SA3 in FIG. 6) and the procedure proceeds to step SA7.

In addition, in step SA2, if the sum SUMmax exceeds the load demand of the heat source system 1, the number-of-units control device 100 then extracts the minimum load in the appropriate operating region of the presently operated heat source apparatus (the minimum load factor in the appropriate operating region), calculates a sum SUMmin of these values, and determines whether this sum SUMmin is less than the load demand (step SA4 in FIG. 6). If, as a result, the sum SUMmin is equal to or more than the load demand, the number of units in operation is reduced to within the range where the present load demand can be covered fully (step SA5 in FIG. 6), and the procedure proceeds to step SA7. In addition, in the above-described step SA4, if the sum SUMmin is less than the load demand of the heat source system 1, the number of units in operation is maintained (step SA6 in FIG. 6), and the procedure proceeds to step SA7. In steps SA3 and SA5, the number of units in operation is changed on the basis of, for example, the priority order of the on and off of the respective heat source apparatuses, which is set in advance.

In step SA7, the load demand is distributed to the presently operating heat source apparatuses in a predetermined proportion (for example, in equal proportion), and a cooling-waterflow-rate command value corresponding to the load allocated to each of the heat source apparatuses is sent to each of the heat-source-apparatus control devices (step SA8 in FIG. 6).

The respective heat-source-apparatus control devices 74-1, 74-2, and 74-3 then obtain the appropriate operating regions for themselves at the predetermined time intervals and send these appropriate operating regions to the number-of-units control device 100, and then, the number-of-units control device 100 repeatedly performs the series of procedures shown in FIG. 6 at the predetermined time intervals, thereby enabling operation of the respective heat source apparatuses in their appropriate operating regions at all times.

As described above, with the heat source system 1 according to this embodiment, each of the heat-source-apparatus control devices 74-1, 74-2, and 74-3 has the COP map for its heat source apparatus, obtains the appropriate operating region corresponding to the operating status at various times from this COP map, and sends this appropriate operating region to the number-of-units control device 100; therefore, the number-of-units control device 100 can ascertain the appropriate operating region of each of the heat source apparatuses at all times, even if no COP characteristic etc. related to the respective heat source apparatuses under control is held and can distribute the load within the appropriate operating region to each of the heat source apparatuses.

By doing so, it is possible to eliminate manual adjustment, such as storing of the COP map in the number-of-units control device etc., at the time of system installation or installation of additional heat source apparatuses in buildings etc.

In this embodiment, the case where the heat-source-apparatus control devices 74-1, 74-2, and 74-3 have the COP characteristic for every cooling water inlet temperature has been described; however, for example, the heat-source-apparatus control devices 74-1, 74-2, and 74-3 may have the COP characteristic for every outside air temperature. In addition, for example, in the COP characteristic shown in FIG. 5, because each of the cooling water inlet temperatures is set discretely, the COP characteristic may not exist for some of the cooling water inlet temperatures. In this case, an interpolating process etc. may be performed to obtain the COP characteristic that corresponds to the present cooling water inlet temperature by calculation, thereby setting the appropriate operating region.

In addition, in this embodiment, each of the heat-source-apparatus control devices 74-1, 74-2, and 74-3 extracts the COP characteristic that corresponds to the cooling water inlet temperature at various times from the COP map, obtains the appropriate operating region from this COP characteristic, and sends it to the number-of-units control device 100; however, instead of this, each of the heat-source-apparatus control devices 74-1, 74-2, and 74-3 may send the COP map itself or the COP characteristic that corresponds to the cooling water inlet temperature at various times to the number-of-units control device 100. In this case, the number-of-units control device 100 sets the appropriate operating region in each of the heat source apparatuses 11, 12, and 13.

In addition, each of the heat source apparatuses 11, 12, and 13 may have a COP map in which the amount of heat output has been employed instead of the load factor of the COP map shown in FIG. 5, may set the appropriate operating region related to the amount of heat output from this COP map, and may send these to the number-of-units control device 100.

In addition, in this embodiment, the case where three heat source apparatuses are provided has been described; however, the number of installed heat source apparatus is not specifically limited.

[Second Embodiment]

Next, a heat source system according to a second embodiment of the present invention will be described. The heat source system according to this embodiment differs from the above-described first embodiment in that each of the heat-source-apparatus control devices has the operable region as information, and a load factor region (first load region) that is the appropriate operating region and operable region in the above-described COP characteristic is reported to the number-of-units control device 100.

The heat source system according to this embodiment will be described specifically below.

For the sake of performance, safety, and so forth, an allowable region for operation is set for the turbo compressor provided in the heat source apparatus, the inverter that drives the turbo compressor, and so forth. For example, with the turbo compressor, because the occurrence of surging and choke will deteriorate the safety thereof, an operable load region is set so as to avoid these regions. In addition, in order to prevent overcurrent etc., an operable load region is also set for the inverter that drives the turbo compressor. As described above, the operable load region for the whole heat source apparatus is defined by itself based on the operable region of each of the components of the heat source apparatus.

Figure 9:
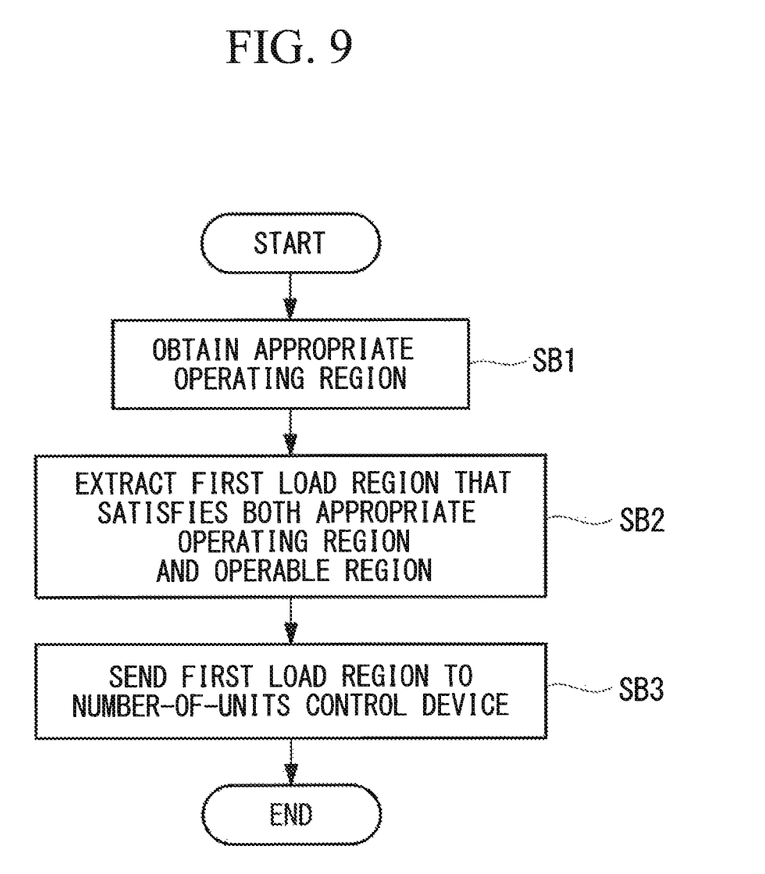
FIG. 9 is a diagram showing a control flow of a heat source apparatus of the heat source system according to the second embodiment of the present invention.

In this embodiment, each of the heat-source-apparatus control devices has its own operable region, obtains the appropriate operating region in a similar way as in the above-described first embodiment (step SB1 in FIG. 9), extracts the first load region that satisfies both the appropriate operating region obtained by step SB1 and the operable region that is set based on the restrictions derived from the functions of the heat source apparatuses (step SB2 in FIG. 9), and sends the first load region to the number-of-units control device (step SB3 in FIG. 9).

The number-of-units control device performs number-of-units control of the heat source apparatuses by executing the control flow shown in FIG. 6 on the basis of the first load region sent from each of the heat-source-apparatus control devices.

As described above, according to the heat source system of this embodiment, the load region suitable for operation is set by considering not only the appropriate operating region, but also the operable region that is restricted for the sake of performance and safety of the respective devices constituting the heat source apparatuses, and this load region is reported to the number-of-units control device; therefore, in the number-of-units control device, it is possible to operate each of the heat source apparatuses in a more suitable load region. By doing so, it is possible to prevent deterioration etc. of the devices in the respective heat source apparatuses, and the lifetime thereof can be extended.

[Third Embodiment]

Figure 10:
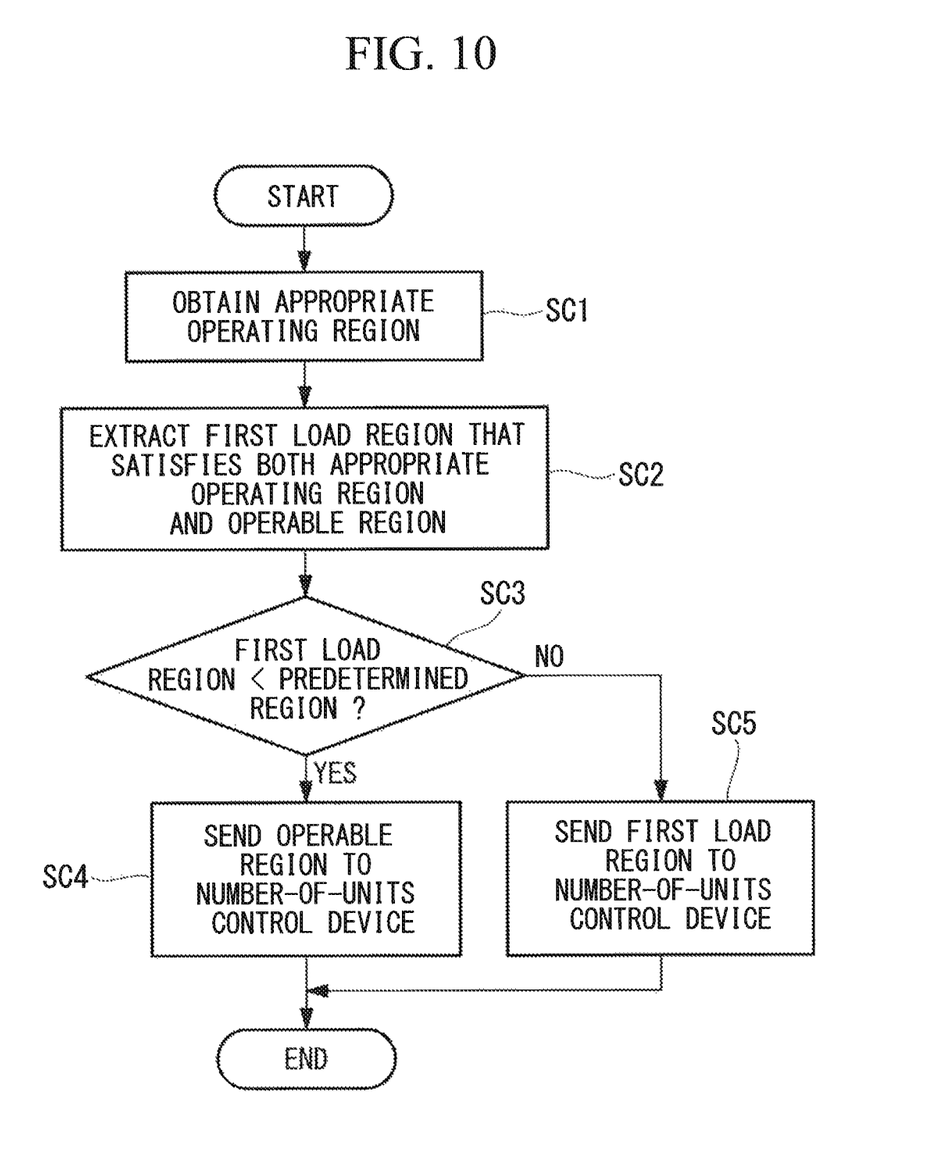
FIG. 10 is a diagram showing a control flow of a heat source apparatus of the heat source system according to the third embodiment of the present invention.

Next, a heat source system according to a third embodiment of the present invention will be described. In the above described second embodiment, although the first load region that satisfies both the appropriate operating region and the operable region is sent to the number-of-units control device, if the first load region satisfying the above-described condition is considerably narrow, the heat source apparatus cannot be operated in the desired fashion, and there is a risk of a problem in that the load demand cannot be covered fully even if all of the heat source apparatuses are activated. In order to overcome such a problem, in the heat source system according to this embodiment, if the load region that satisfies both the appropriate operating region and the operable region is equal to or less than a predetermined threshold, that operable region is sent to the number-of-units control device. Specifically, as shown in FIG. 10, each of the heat-source-apparatus control devices obtains the appropriate operating region in a similar way as in the above-described first embodiment (step SC1 in FIG. 10), extracts the first load region that satisfies both the appropriate operating region obtained by step SC1 and the operable region that is set based on the restrictions derived from the functions of the heat source apparatuses (step SC2 in FIG. 10), and determines whether or not the first load region is narrower than a predetermined region set in advance (step SC3 in FIG. 10). If, as a result, the first load region is narrower than the predetermined region, each of the heat-source-apparatus control devices sends the operable region to the number-of-units control device (step SC 4). In step SC3, if the first load region is not narrower than the predetermined region, each of the heat-source-apparatus control devices sends the first load region to the number-of-units control device (step SC 5).

By doing so, it is possible to avoid a situation in which the first load region that satisfies both the appropriate operating region and the operable region is so narrow that the load demand cannot be satisfied.

In addition, in this embodiment, the operable region is sent to the number-of-units control device when the load region that satisfies both the appropriate operating region and the operable region is narrower than a predetermined region; however, a specific operable region may be sent to the number-of-units control device when a predetermined condition is satisfied, for example.

Figure 8:
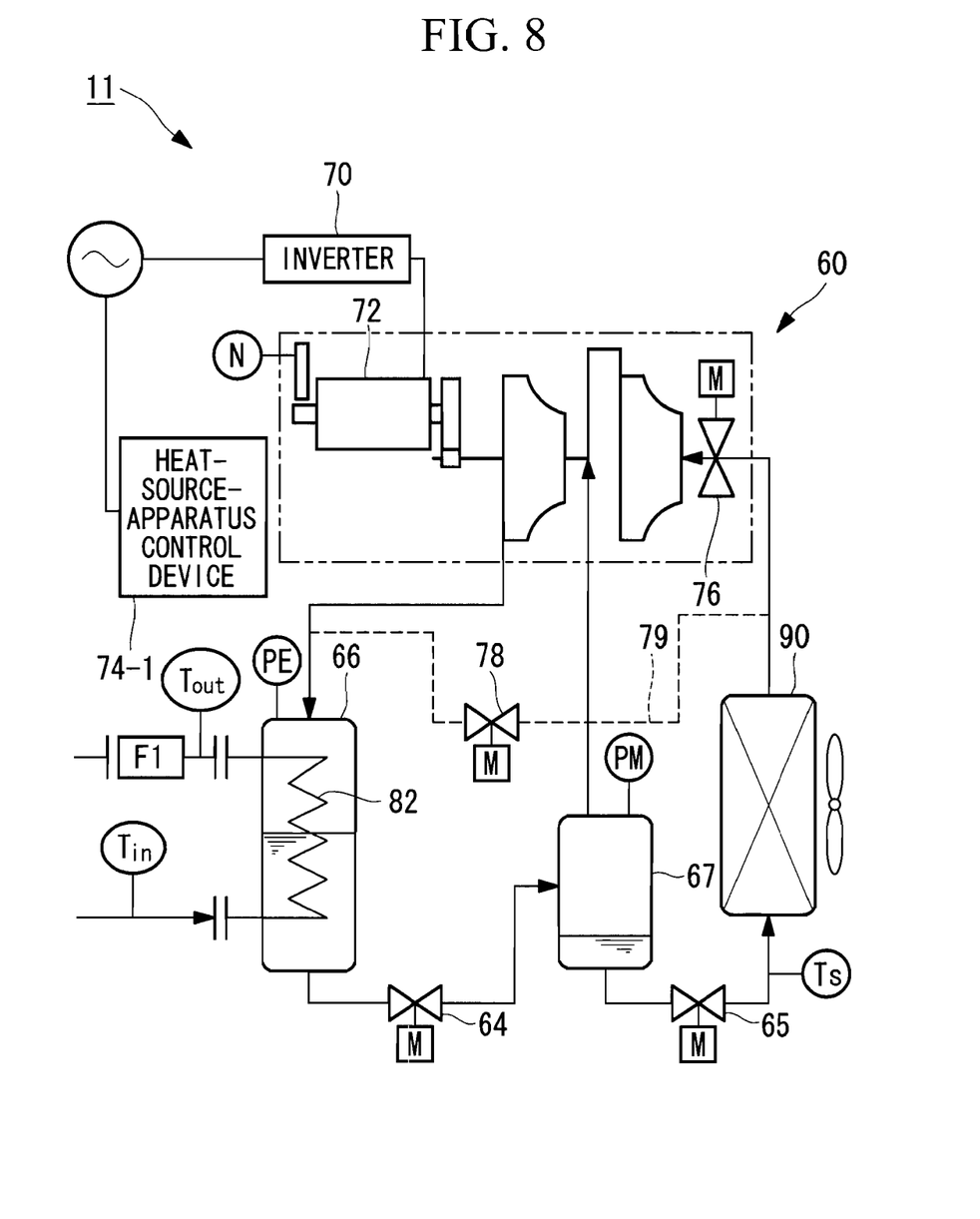
FIG. 8 is a diagram showing an example of a heat source apparatus that is employed in the heat source system of FIG. 1.

For example, as shown in FIG. 8, in the case of a heat source apparatus that performs a heating operation by conducting heat exchange between the refrigerant and the air with the air heat exchanger 90, if the heating operation is conducted when the outside air temperature is low and the humidity is high, frost formation tends to occur, which interferes with continuing the operation. In this case, a defrost operation (frost removing operation) for removing the frost is normally conducted by temporally switching the heating operation to the cooling operation. However, conducting such a defrost operation will greatly lower the operating efficiency because, instead of the original heating operation, the opposite cooling operation has to be conducted.

Figure 11:
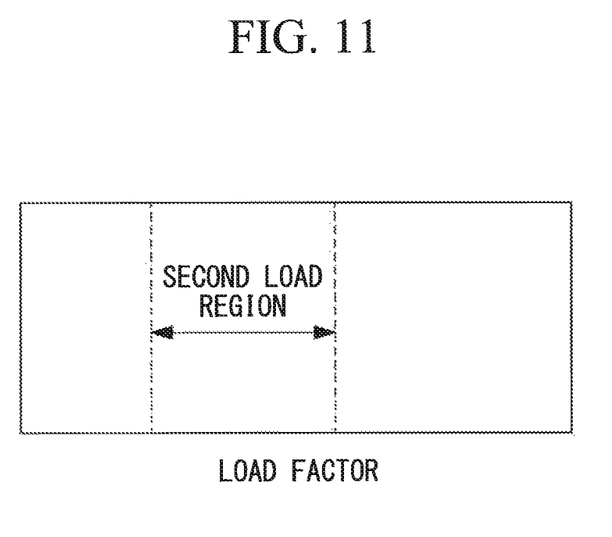
FIG. 11 is a diagram showing an example of a second load range according to the second embodiment of the present invention.

Thus, for example, when the outside air temperature is equal to or less than a predetermined temperature and the humidity is equal to or more than a prescribed humidity, in order to prevent the need for a defrost operation, an operable region (second load region; see, for example, FIG. 11) is set so as to suppress the load factor of the heating operation, and this operable region is sent to the number-of-units control device 100. By doing so, in the number-of-units control device, it is possible to allocate the load to each of the heat source apparatuses within a load range in which the defrost operation will not be needed and to operate each of the heat source apparatuses in the efficient load region.

Figure 7:
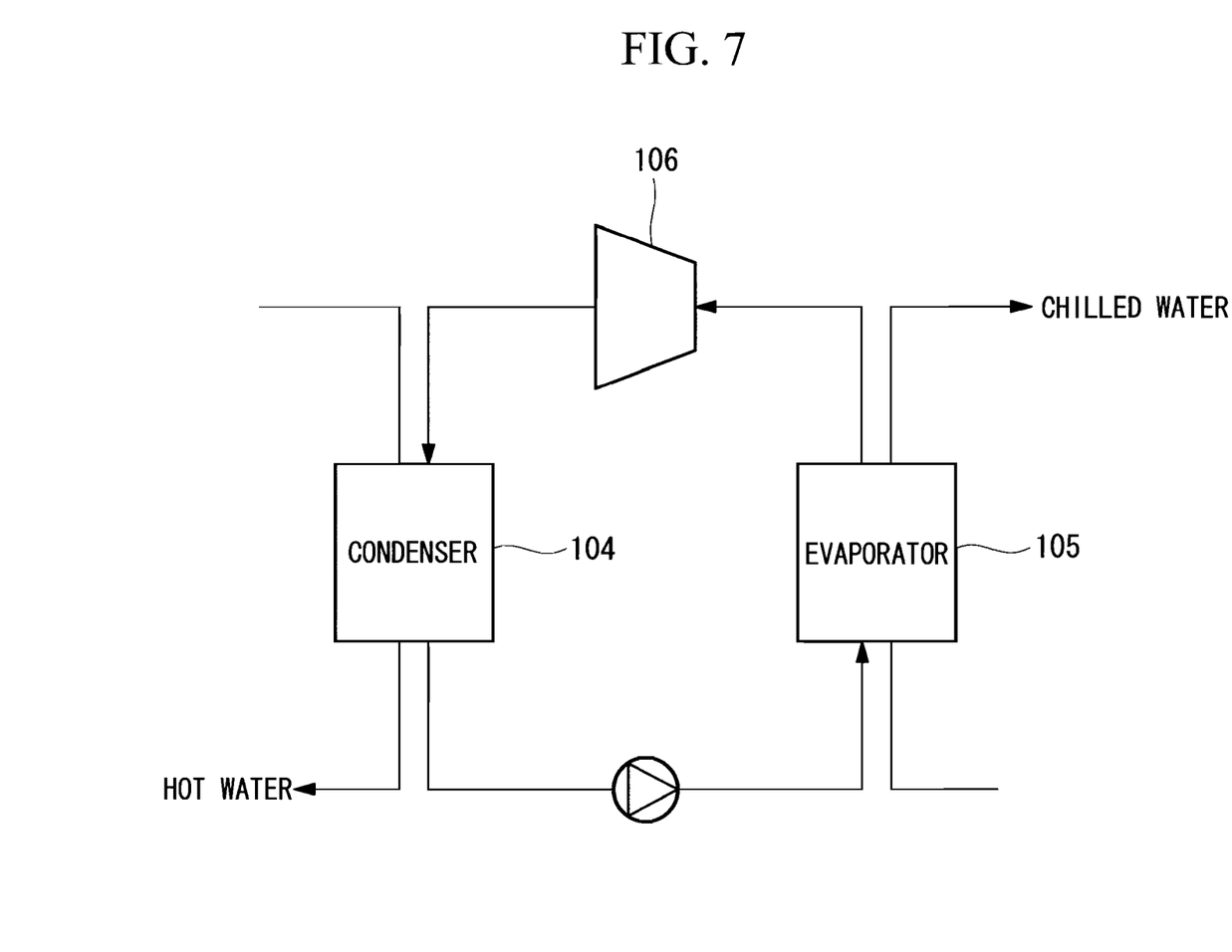
FIG. 7 is a diagram showing an example of a heat source apparatus for explaining the operation of a heat source system according to a third embodiment of the present invention.

In addition, for example, when employing a heat-recovery device configured by, as shown in FIG. 7, connecting a load to both a condenser 104 and an evaporator 105, produces hot water in the condenser 104, and produces chilled water in the evaporator 105 as the heat source apparatus, control logic in which the operation of a compressor 106 is stopped when the temperature of the chilled water produced in the evaporator 105 has reached the target value may be established. In this case, even though hot water of a reasonable temperature needs to be produced in the condenser 104, the compressor 106 is stopped due to the temperature determination in the evaporator 105, causing a problem in that hot water cannot be heated to the target temperature in the condenser 104.

In such a case, it is preferable to prevent the chilled water temperature in the evaporator 105 from reaching the target temperature too quickly, in other words, to make an adjustment in such a manner that the chilled water temperature reaches the target temperature slowly over a predetermined time.

For example, as shown in FIG. 7, if the load is present for both the condenser 104 and evaporator 105, an operable region (second load region) that suppresses the upper limit of the load in the evaporator 106 is set, and this operable region is reported to the number-of-units control device 100. By doing so, it is possible to prevent the chilled water temperature in the evaporator 105 from satisfying the target temperature before the hot water temperature in the condenser is achieved.

REFERENCE SIGNS LIST 1 heat source system
11, 12, and 13 heat source apparatus
74-1, 74-2, 74-3 heat-source-apparatus control device
60 turbo compressor
62 condenser
64 high-pressure expansion valve
65 low-pressure expansion valve
66 evaporator

The invention claimed is:

1. A heat source system comprising:
a plurality of heat source apparatuses connected in parallel; and
a number-of-units control device that controls on and off of the plurality of heat source apparatuses and allocates a load to an active heat source apparatus according to a load demand,
wherein each of the heat source apparatuses is configured to;
possess COP information, unique to the respective heat source apparatuses, that indicates a relationship among operating status, coefficient of performance, and load factor,
set, at a predetermined timing, an appropriate operating region that is a load region where the coefficient of performance is equal to or more than a predetermined value from the possessed COP information,
when an operable region has been set on the basis of devices provided in the heat source apparatus, set a first load region that satisfies both the appropriate operating region and the operable region, and determine whether or not the first load region is narrower than a predetermined region set in advance, and
send any of the appropriate operating region when the operable region has not been set, the operable region when the first region is narrower than the predetermined region, and the first load region when the first region is not narrower than the predetermined region to the number-of-units control device at a predetermined timing, and
wherein the number-of-units control device performs number-of-units control and load allocation such that each of the heat source apparatuses is operated within the appropriate operating region or the operable region or the first load region which is received from the each of the heat source apparatus.

2. A heat source system according to claim 1, wherein the heat source apparatus possesses, in such a manner as to be associated with each other, a second load region for further increasing operating efficiency in the heat source apparatus and a condition for employing the second load region and sends the second load region to the number-of-units control device when the condition for employing the second load region is satisfied, and the number-of-units control device performs number-of-units control and load allocation such that the heat source apparatus to which the second load region has been sent is operated within the second load region.

3. A heat source system according to claim 1, wherein the heat source apparatus is a centrifugal chiller comprising:
a turbo compressor of either an inverter-driven variable-rotation-speed type or a fixed-rotation-speed type;
a condenser that condenses the refrigerant compressed by the turbo compressor;
an expansion valve that expands the condensed refrigerant; and
an evaporator that evaporates the expanded refrigerant to cool chilled water.

4. A heat source system comprising:
a plurality of heat source apparatuses connected in parallel; and
a number-of-units control device that controls on and off of the plurality of heat source apparatuses and allocates a load to an active heat source apparatus according to a load demand,
wherein each of the heat source apparatuses is configured to;
possess COP information unique to the respective heat source apparatuses that indicates a relationship among operating status, coefficient of performance, and load factor, and
send the information related to the possessed COP information and an operable region when the operable region has been set on the basis of devices provided in the heat source apparatus to the number-of-units control device at a predetermined timing, and
wherein the number-of-units control device is configured to;
set, for each heat source apparatus, an appropriate operating region that is a load region where the coefficient of performance of each of the heat source apparatuses is equal to or more than a predetermined value on the basis of the information related to the COP information that is sent from the respective heat source apparatus,
with respect to the heat source apparatus from which the operable range is received, set a first load region that satisfies both the appropriate operating region and the operable region, and determine whether or not the first load region is narrower than a predetermined region set in advance, and
perform number-of-units control and load allocation such that the heat source apparatus in which the operable region has not been set is operated within the appropriate operating region thereof, the heat source apparatus whose first load region is not narrower than the predetermined region is operated within the first load region, and the heat source apparatus whose first load region is narrower than the predetermined region is operated within the operable region.

5. A heat source system according to claim 2, wherein the condition for employing the second load region is such that the outside air temperature is equal to or lower than a predetermined temperature and the humidity is equal to or more than a predetermined humidity, and
wherein the second load region has been set to a range that the defrost operation is not needed.

* * * * *